Nov. 25, 1958   R. CLADE   2,861,773
SPHERICAL PLUG VALVE
Filed Dec. 15, 1954
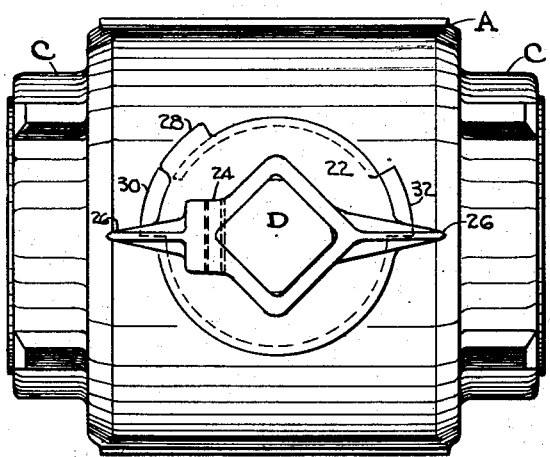
FIG. 2
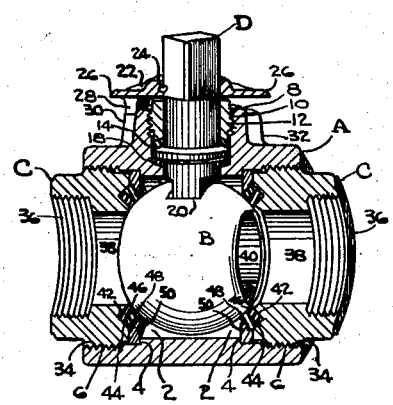
FIG. 1
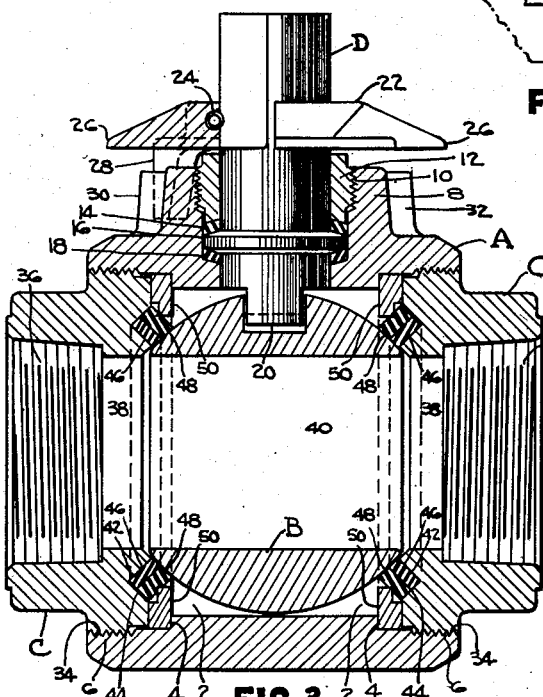
FIG. 3
FIG. 7
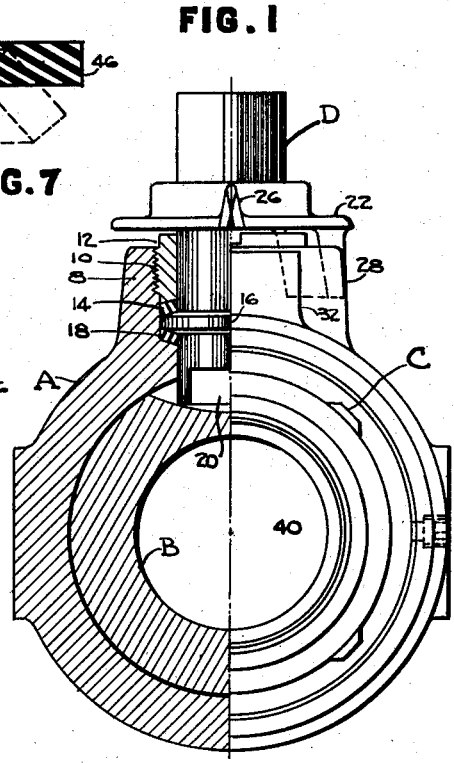
FIG. 4
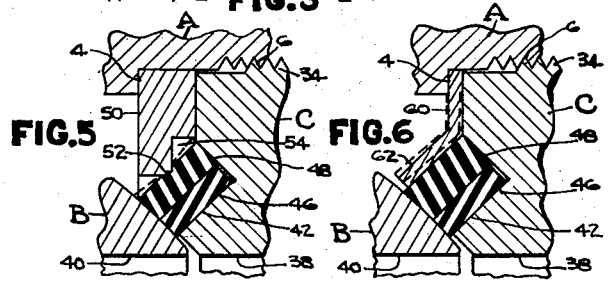
FIG. 5   FIG. 6
INVENTOR
ROBERT CLADE
BY
Hart, Shields & Price
ATTORNEYS

United States Patent Office 2,861,773
Patented Nov. 25, 1958

2,861,773

SPHERICAL PLUG VALVE

Robert Clade, Detroit, Mich., assignor, by mesne assignments, to ACF Industries, Incorporated, a corporation of New Jersey Application December 15, 1954, Serial No. 475,330

5 Claims. (Cl. 251—315)

This invention relates to spherical plug valves particularly of the type which are subjected to rapid temperature changes, yet which must retain a tight seal at all times.

Valves as heretofore constructed were hard to maintain tight on temperature changes due to the fact that the different materials forming the body, plug and seals had different coefficients of expansion and while they could normally be retained reasonably tight on increase of temperature would leak on decrease of temperature. It is an object therefore, of the present invention to provide a valve of the spherical plug type in which the seals are so arranged with respect to a special clamping means as to effectively seal the valve against leakage upon change of temperature.

A further object of the invention is the provision of a valve of the spherical ball type having seat and seal rings of resilient material so clamped in the body as to permit their movement upon changes in temperature of the valve.

A still further object of the invention is the provision of a spherical ball valve having resilient sealing means and resilient clamping means for retaining the sealing means in contact with the body and plug.

These and other objects of the invention will be apparent to persons skilled in the art from a study of the following description and accompanying drawings in which:

Fig. 1 is a half-perspective view of the improved valve.

Fig. 2 is an elevational view showing the valve in open position.

Fig. 3 is a longitudinal sectional view taken substantially on the center line of the valve.

Fig. 4 is an end view of the valve with half in section so as to better disclose the construction.

Fig. 5 is an enlarged detail of the clamping arrangement shown in Figs. 1 and 3.

Fig. 6 is an enlarged sectional view similar to Fig. 5, but showing a slight modification, and Fig. 7 is an enlarged sectional view showing the seal ring by full line in its normal unstressed condition and by line and dash outline in its stressed condition, as shown in Figs. 1, 3, 5 and 6.

Referring now to the drawings in detail, it will be seen that the valve consists of a generally tubular body portion A within which is rotatably mounted a spherical plug B held in position centrally of the body by end closures C. Rotation of the plug or ball is controlled by stem D extending outwardly of the body. The body which, as stated, is of generally tubular formation has a passage 2 enlarged at its ends to provide shoulders 4 outwardly of which it is formed with threads 6. A boss or enlargement 8 is formed on the body and formed with a bore extending into the body passage. This bore is threaded as at 10 to receive a packing nut 12. This packing nut has its inner end tapered to engage a conical formed sealing ring 14 positioned above a tapered shoulder 16 formed on the operating stem D. Inwardly of the shoulder 16 a second sealing ring 18 is provided similar in construction to the ring 14. These sealing rings 14 and 18 are preferably made of a chemically inert material such as polytetrafluoroethylene and are normally flat but deformed to their conical shape when in use. The inner end of stem D extends into the body passage and is formed with a narrow portion 20 adapted to engage the ball B. In order to limit the rotation of the stem a combined indicator and stop plate 22 is fastened on the stem by a roll-pin 24. The plate as shown is formed with indicating pointers 26 and a downwardly projecting stop 28 adapted to engage limiting stops 30 and 32 formed on the body boss.

As shown, the end closures C are externally threaded as at 34 to engage with threads 6 of the body and also internally threaded as at 36 to receive a pipeline or other mounting means for the valve. These closure members are also provided with a flow passage 38 adapted to line up with the flow passage 40 of the spherical ball or plug B. The inner ends of the end closures are machined to provide conical surface 42 diverging outwardly of the valve and joining the inwardly diverging conical surface 44. These conical surfaces 42 and 44 form a V-shaped groove in the end closure members for the purpose of receiving and supporting the sealing means for the plug. As shown, these sealing means are formed by a pair of annular rings which in their normal position are flat, as shown by full lines in Fig. 7. The inner or sealing ring 46 is supported in its deformed position on the conical surface 42 and it in turn supports the seating ring 48. The sealing rings 46 are designed so as to project slightly inwardly of the seating rings 48 so that when the parts are assembled by bringing the spherical plug B to its seat on ring 48 the spherical plug B presses against the inside circumference of seal ring 46 tensioning the seal ring; therefore, the seal ring will act in hoop tension to closely engage the ball and seal against leakage of material in either direction. The main bearing pressure is absorbed by the seat ring 48 while the seal ring acts to stop any leakage which might pass the seat ring. In order to hold the sealing rings in proper and predetermined position clamping rings 50 are provided. These rings, as shown in Figs. 1, 3 and 5, will be tightly clamped against the body shoulders 4 by the end closure members C. As shown, the inner edges of these clamping rings are stepped as at 52 to provide a space 54 between the seat ring and the clamping ring. As shown, the outer edge of the stepped portion engages the central area of the seat ring 48 thereby tightly holding the same in position and holding both the seat ring and seal ring in engagement with the conical surfaces of the end closure and with the surface of the ball B. The seat and seal rings are preferably made of an inert material such as polytetrafluoroethylene which material has a coefficient of expansion many times that of iron or other metals and since the polytetrafluoroethylene flows under heavy pressure it will flow when the temperature of the valve increases, but cannot return to its former position rapidly enough by itself to prevent leakage. However, with the clamping ring shown the material may bend into clearance space 54 and toward the center of the valve as clearly shown by dotted line in Fig. 5. In this case when the temperature decreases the bent material flows rapidly and resumes its former flat shape due to the resilient action of the material. This action is possible since the shape of the clamping ring is such as to permit the material to bend without permanently distorting; therefore, since the material did not have to take a new permanent set, the material can rapidly return to its original shape.

As shown in Fig. 6, the clamping ring is modified and is formed with a lip 60 adapted to be gripped between the body shoulder and end closure and the inner end of the lip is bent inwardly so as to form a conical extension 62 engaging and supporting the seat ring 48. This clamping ring is formed of a resilient material such as spring steel and will upon temperature increase move to the dotted position shown in Fig. 6 thereby constantly exerting a resilient force to return the seat ring to its normal assembled position upon decrease of temperature in the valve.

It will be obvious from the preceding description that modifications may be made within the scope of the following claims while still retaining all the advantages set forth.

What is claimed is:

1. In a spherical plug valve the combination of a valve body, a body flow passage extending through the body, closure means partially closing the ends of said passage and providing a space therebetween, each of said closure means having a flow passage communicating with the body flow passage, a spherical plug rotatably mounted in the body in said space, said plug having a flow passage adapted to be brought into and out of registry with the flow passages, the inner end portion of each closure means having a conical surface diverging outwardly of the valve, annular resilient means adapted to bear on said conical surfaces and spherical plug, the annular resilient means having a coefficient of expansion greater than the other material in the valve, an annular metallic ring forming clamping means retaining said resilient means in bearing engagement with said conical surfaces, said clamping means engaging said resilient means in an annular area adjacent the midpoint of the side opposite the conical surface of the closure means.

2. In a spherical plug valve the combination of a valve body, a body flow passage extending through the body, closure means partially closing the ends of said body flow passage and providing a space therebetween, each of said closure means having a flow passage communicating with the body flow passage, a spherical plug rotatably mounted in the body in said space, said plug having a flow passage adapted to be brought into and out of registry with the flow passages, the inner end portion of each closure means having a conical surface diverging outwardly of the valve, a pair of initially flat annular rings disposed on either side of the plug and between the conical surface of the closure means and the plug, and a clamping ring inwardly of each pair of initially flat rings engaging the body, one of said annular rings and closure means to distort the annular rings into a conical form and onto said conical surfaces.

3. In a spherical plug valve the combination of a valve body, a body flow passage extending through the body, closure means partially closing the ends of said passage and providing a space therebetween, each of said closure means having a flow passage communicating with the body flow passage, a spherical plug rotatably mounted in the body in said space, said plug having a flow passage adapted to be brought into and out of registry with the flow passages, the inner end portion of each closure means having a conical surface diverging outwardly of the valve, a seal ring having hoop tension engagement with said plug, a seat ring adapted to engage and support said plug in position within the body, and separate clamping means retaining said seal ring in engagement with the conical surface and said seat ring in engagement with said seal ring and both in engagement with the plug, said clamping means being resilient to follow the expansion and contraction changes of the seat ring upon temperature change in the valve.

4. In a spherical plug valve, the combination of a valve body, a body flow passage extending through the body, closure means partially closing the ends of said passage and providing a space therebetween, each of said closure means having a flow passage communicating with the body flow passage, a spherical plug rotatably mounted in the body in said space, said plug having a flow passage adapted to be brought into and out of registry with the flow passages, the inner end portion of each closure means having a conical surface diverging outwardly of the valve, annular resilient sealing means adapted to bear on said conical surfaces and spherical plug, the annular resilient means having a coefficient of expansion greater than the other material in the valve, a metallic resilient member having an outer annular planar portion secured between the body and closure means and an inner conical portion engaged with said sealing means forming clamping means retaining said resilient means in bearing engagement with said conical surfaces, said clamping means resiliently holding said annular resilient means in engagement with the conical surface and spherical plug.

5. In a spherical plug valve, a valve body assembly having a flow passage therethrough, a closure means having an opening therein for registry with said flow passage, said closure means being axially movable into said body at one end of said passage and forming a part of said assembly, a spherical plug rotatably mounted in said body and having a flow passage therethrough, the inner end portion of said closure means having a conical surface diverging outwardly of the valve, at least one initially flat annular seating and sealing ring disposed between the conical surface of the closure means and the spherical plug, and a clamping ring inwardly of said initially flat ring engaging the body, annular ring and closure means to distort the annular ring into a conical form and onto said conical surface.

References Cited in the file of this patent

UNITED STATES PATENTS

| | | |
|---|---|---|
| 1,428,267 | Soldane | Sept. 5, 1922 |
| 2,533,931 | Hartley | Dec. 12, 1950 |
| 2,586,715 | Richeson et al. | Feb. 19, 1952 |
| 2,640,677 | Craven | June 2, 1953 |
| 2,762,601 | Clade | Sept. 11, 1956 |

FOREIGN PATENTS

| | | |
|---|---|---|
| 622,149 | Great Britain | of 1949 |